(12) United States Patent
May

(10) Patent No.: US 8,602,190 B2
(45) Date of Patent: Dec. 10, 2013

(54) ELECTRONICALLY CONTROLLED VISCOUS FAN DRIVE WITH BUSHING

(75) Inventor: James Patrick May, Jackson, MI (US)

(73) Assignee: BorgWarner Inc., Auburn Hills, MI (US)

( * ) Notice: Subject to any disclaimer, the term of this patent is extended or adjusted under 35 U.S.C. 154(b) by 298 days.

(21) Appl. No.: 12/990,794

(22) PCT Filed: Apr. 30, 2009

(86) PCT No.: PCT/US2009/042277
§ 371 (c)(1),
(2), (4) Date: Mar. 29, 2011

(87) PCT Pub. No.: WO2009/140073
PCT Pub. Date: Nov. 19, 2009

(65) Prior Publication Data
US 2011/0168512 A1 Jul. 14, 2011

Related U.S. Application Data

(60) Provisional application No. 61/052,643, filed on May 13, 2008.

(51) Int. Cl.
*F16D 35/02* (2006.01)
(52) U.S. Cl.
USPC .................................... 192/58.61; 192/110 B

(58) Field of Classification Search
USPC .......................................... 192/58.61, 110 B
See application file for complete search history.

(56) References Cited

U.S. PATENT DOCUMENTS

| | | | |
|---|---|---|---|
| 4,633,994 A * | 1/1987 | Light | 192/58.61 |
| 6,085,881 A | 7/2000 | Robb | |
| 6,419,064 B1 | 7/2002 | Krammer | |
| 6,557,686 B1 * | 5/2003 | Budd et al. | 192/84.1 |
| 7,278,524 B2 | 10/2007 | Boyer | |
| 7,980,373 B2 * | 7/2011 | Boyer | 192/58.61 |
| 2003/0006117 A1 * | 1/2003 | Tilly et al. | 192/58.61 |
| 2004/0242335 A1 | 12/2004 | Yamauchi | |
| 2006/0243817 A1 * | 11/2006 | Light et al. | 237/12.3 R |

* cited by examiner

Primary Examiner — Richard M. Lorence

(57) ABSTRACT

A viscous shear fan drive mechanism for a cooling fan. A moveable valve disk is provided which controls the quantity of fluid in the operating chamber. An electronic actuation system activates piston and shaft members which move the valve disk against the bias of a return spring to open the fill holes, allow fluid communication between the reservoir and working chambers, and allow rotation of the cooling fan. Without activation of the electronic actuation system, the flow of fluid to the working chamber is prevented. A non-magnetic or insulating bushing member adjacent the piston and shaft members prevents the system from sticking in the actuation condition when power is eliminated.

12 Claims, 4 Drawing Sheets

ELECTRONICALLY CONTROLLED VISCOUS FAN DRIVE WITH BUSHING

CROSS REFERENCE TO RELATED APPLICATIONS

This application claims priority to Application No. 61/052,643 filed on May 13, 2008, and entitled "Electronically Controlled Viscous Fan Drive With Bushing", which is incorporated by reference herein.

TECHNICAL FIELD

The invention relates to fan drive systems and more specifically to electronically controlled viscous fan drive systems.

BACKGROUND OF THE INVENTION

The present invention relates to fluid coupling devices of the type including both fluid operating chambers and fluid reservoir chambers, and valving which controls the quantity of fluid in the operating chamber.

Although the present invention may be used advantageously in fluid coupling devices having various configurations and applications, it is especially advantageous in a coupling device of the type used to drive a radiator cooling fan of an internal combustion engine, and will be described in connection therewith. It is to be understood, however, that the present invention is not to be limited to use in fan cooling systems for automobiles and other vehicles, but has use in any cooling system for any engine.

Fluid coupling devices ("fan drives") of the viscous shear type have become popular for driving engine cooling fans, primarily because their use results in substantial savings of engine horsepower. The typical fluid coupling device operates in the engaged, relatively higher speed condition only when cooling is needed, and operates in a disengaged, relatively lower speed condition when little or no cooling is required.

Today, electronically activated viscous fan drives are known and which can be precisely controlled between engaged, partially engaged and disengaged modes to control the output at a given fan speed as determined by the vehicle's engine computer.

For some time, one of the problems associated with fluid coupling devices used to drive radiator cooling fans was the phenomenon known as "morning sickness". With these fluid coupling devices (fan drives), there was relatively little "drain back" or "bleed back", i.e. a flow of fluid from the operating chamber back into the reservoir chamber when the engine was turned off and the fan drive ceased rotation. If a significant quantity of fluid was not bled back into the reservoir from the operating chamber, then when the operation of the fan would begin again after a long period of time (for example, the next morning), the fan drive would initially operate in the engaged condition for a period of time until most of the fluid in the operating chamber was pumped back into the reservoir. This existed even though the fan was cold and no cooling was required. Such engaged operation often resulted in an undesirable noise of the fan being driven when it was not required.

Several substantial improvements have been made with fluid coupling devices of the viscous shear type in order to overcome the problem of morning sickness. For example, in U.S. Pat. No. 6,752,251, a valve disk is provided which electronically controls movement of viscous fluid from the reservoir to the anti-bleed back chamber by energizing or deenergizing the actuator based on engine operating conditions.

One of the potential difficulties or concerns with some present fluid coupling devices of the viscous shear type is that the actuator could remain stuck in the engine "on"-electrically activated position, due to an improper flux pattern. In this situation, the fan could remain in operation when cooling is not needed. This could result in an overcooling situation and potentially create additional undesirable emissions from the vehicle engine.

It thus is an object of the present invention to provide an improved viscous shear fluid coupling device which eliminates morning sickness and at the same time minimizes or prevents improper freezing of the actuator member in an "on" position and thus minimizes or prevents the creating of additional undesirable emissions.

SUMMARY OF THE INVENTION

The present invention overcomes potential problems with existing fluid coupling devices of the viscous shear type and provides an electronically controlled viscous fan drive system which prevents the system from undesirable lock-up in the "on" condition. The viscous clutch rotor is positioned inside the cover and body member which form an outer housing. A valve disk is attached to a shaft member which in turn is coupled to an actuating piston. The system is electronically controlled to allow fluid to pass from the reservoir chamber into the fluid operating chamber and activate the cooling fan as needed. The shaft and actuating piston are spring biased by a return spring such that the passageways between the fluid reservoir chamber and the fluid operating chamber are closed when the engine is turned off and no electrical activation is present.

In order to prevent the shaft and piston from being stuck in the "on" position and thus locking up the fan drive in the cooling condition, insulated washers and/or bushings are provided. The insulated members are non-conductive and prevent the electronic flux pattern from passing through them which could keep the shaft and piston from being returned to their rest position by the return spring.

Other features, benefits and advantages of the present invention will become apparent from the following description of the invention, when viewed in accordance with the attached drawing and appended claims.

DESCRIPTION OF PREFERRED EMBODIMENTS

Figure 1:
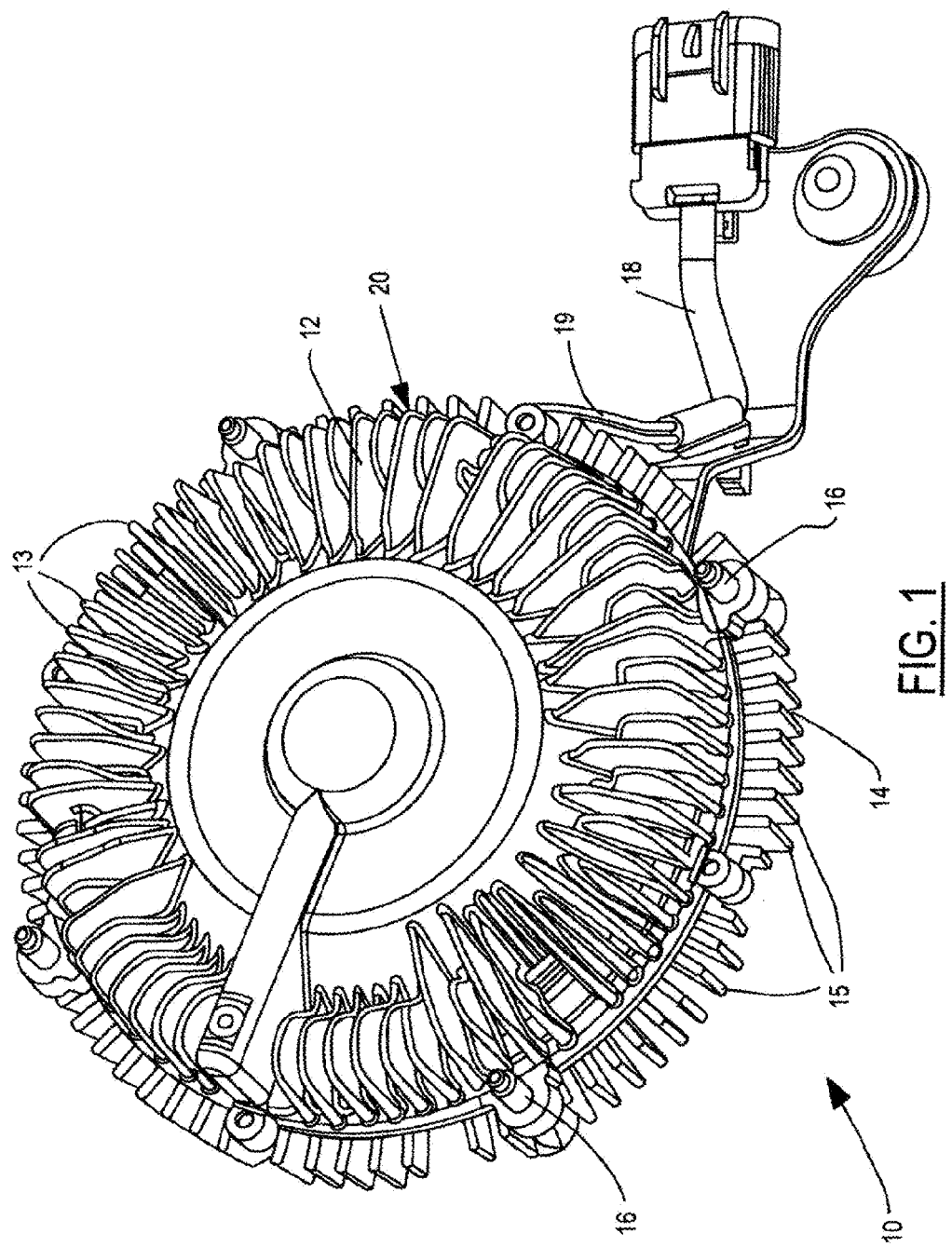
FIG. 1 is a perspective view of a fluid coupling device which contains a preferred embodiment of the present invention.

Referring now to the drawings, which are not intended to limit the invention, FIG. 1 illustrates a preferred form of a fluid coupling device 10 ("viscous fan drive") of a type utilizing the present invention. The fluid coupling device 10 includes a cover member 12 and a body member 14, which are fastened together by bolts, washers, or other fastening means 16 in order to form a housing 20 with an internal cavity 22. The body and cover members can also be secured together by a rollover of the outer periphery of the cover member, as is well known in the art.

The fluid coupling device 10 is attached to a bracket member 18 which is used to mount the fluid coupling device to an engine or other portion of the vehicle or automobile where desired. Electric wire leads 19 are used to provide the electrical power to the actuator 25 in order to actuate it.

The fluid coupling device 10 is adapted to be driven by a liquid cooled engine and, in turn, to drive a radiator cooling fan, neither of which are shown in the drawings. In this embodiment, the fan is attached to the body member 14. The fan may be attached to the body member by any suitable means, such as is generally well known in the art. It should be understood, however, that the use of the present invention is not limited to any particular configuration of a fluid coupling device, or fan mounting arrangement, or any particular application for the fan drive, except as is specifically noted herein. For example, the present invention can be used with a fan drive of the type adapted as a radiator cooling fan attached to the cover member rather than the body member.

The cover member 12 and body member 14 typically are made from an aluminum material in order to save weight and dissipate heat. Also in order to help dissipate heat from the viscous clutch 10, both the cover member and body member have a plurality of radial fins 13 and 15 thereon, respectively. Preferably, the cover and body are made from a die cast material, but it should be understood that the present invention is not limited to use of that material, but the invention could also be used with a viscous fan drive of the type using a stamped cover member. A fan drive with die cast components is shown, for example, in U.S. Pat. No. 7,293,636.

The housing member 20 is adapted to rotate at the input speed from the vehicle engine. The housing member could be connected by a pulley to a belt or the like which is attached to the crankshaft of the engine (not shown) and thus rotate at the same speed as the crankshaft. The housing could also be rotatably driven by the engine water pump. Both of these systems for rotating a fan drive are known in the art and do not have to be described in more detail here.

Figure 2:
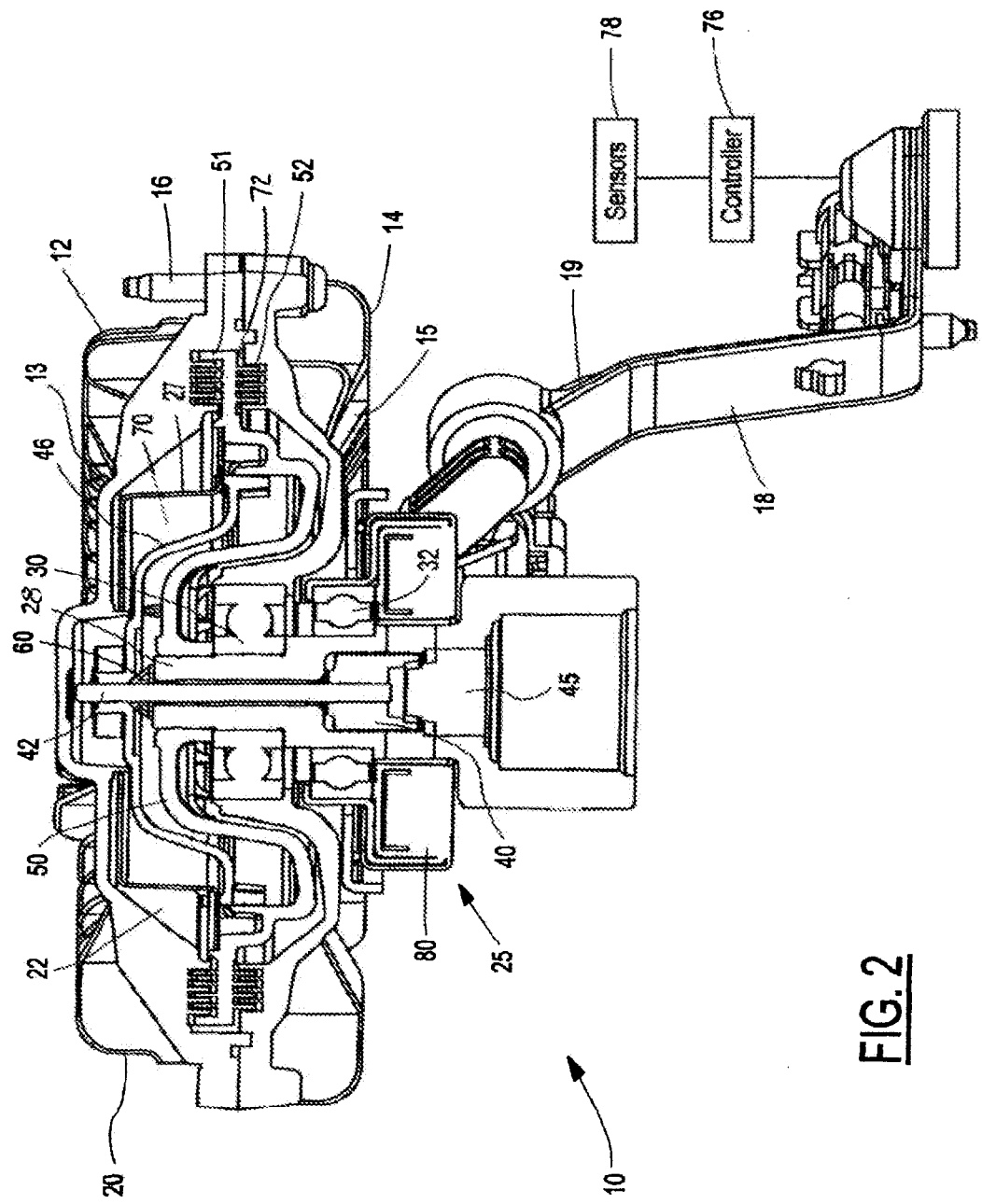
FIG. 2 is a cross-sectional view of the fluid coupling device as shown in FIG. 1.
Figure 3:
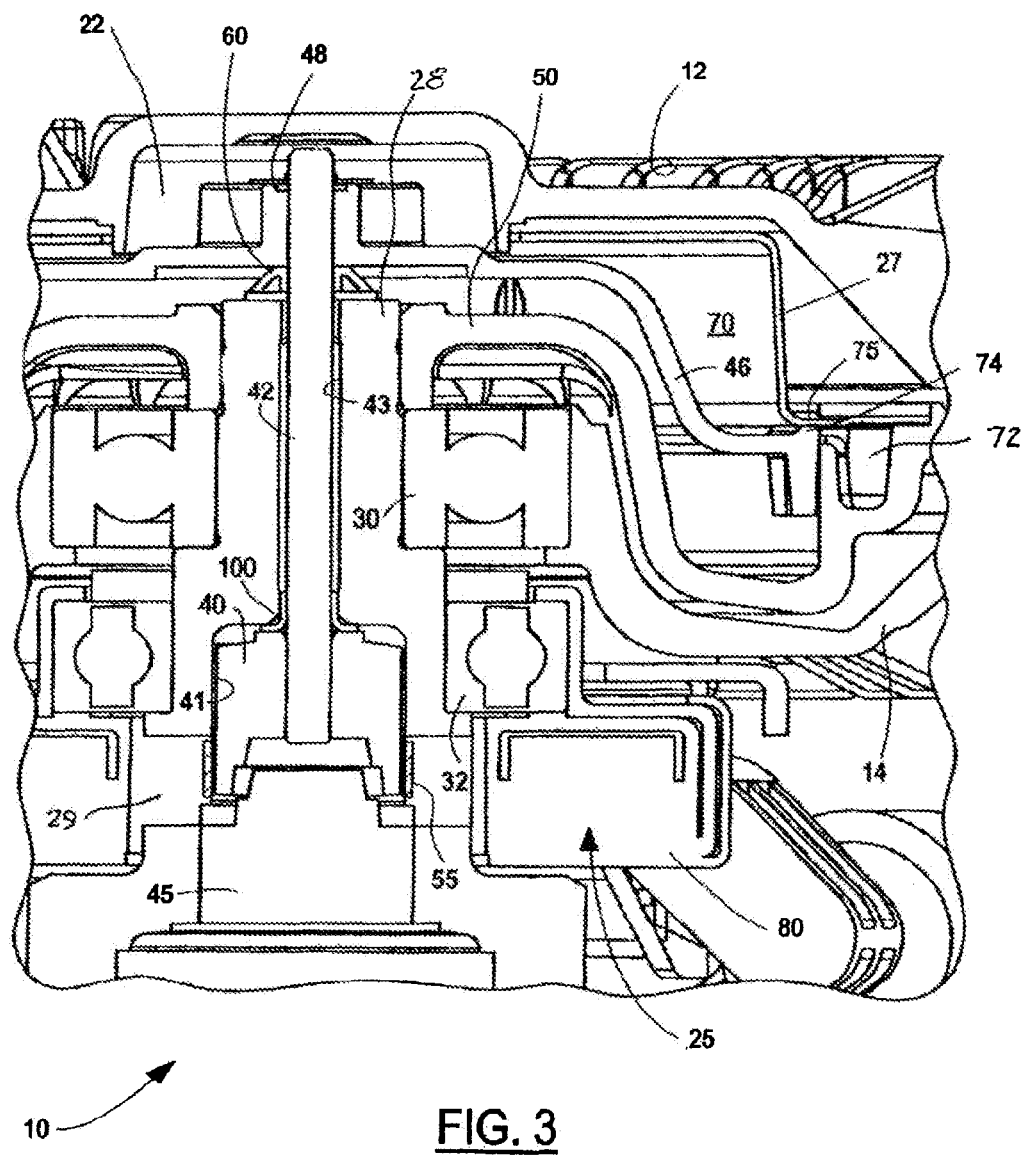
FIG. 3 is an enlarged view of the electrical actuation portion of a fluid coupling device in accordance with the present condition when no electrical power is on and the valve disk is in its rest position.

Referring now to FIGS. 2 and 3, a cross-sectional view of the fluid coupling device 10 of FIG. 1 is shown, together with an expanded or exploded view of a central portion thereof. The housing 20 rotates around a central shaft member 28. For this purpose, bearing sets 30 and 32 are positioned between the housing and shaft member.

Cavities 41 and 43 are provided in the central shaft member 28. An activating piston member 40 and actuator shaft member 42 are positioned in the cavities 41 and 43, respectively. The actuator shaft member 42 extends into the internal cavity 22 of the housing 20. A plug member 45 holds the piston member and actuator shaft member in place.

Rotor member 50 is press fit onto the body member 28 so that the two members rotate together when cooling is needed for the system and the viscous clutch is electrically activated. A valve disk member 46 is attached at or near the distal end of the actuator shaft member 42. The valve disk member 46 is adapted to move with the actuator shaft member 42 when the actuator shaft member is actuated by the electronic mechanism 25 of the viscous clutch. The actuator shaft member 42 is also biased by spring member 60 vertically upwardly in the direction of FIGS. 2, 3 and 4. (The electronically actuated position of the actuator shaft member without electrical actuation is shown in FIG. 3.) A retaining nut 48 is used to fixedly secure the valve disk member 46 on the end of the actuator shaft member 42.

Figure 4:
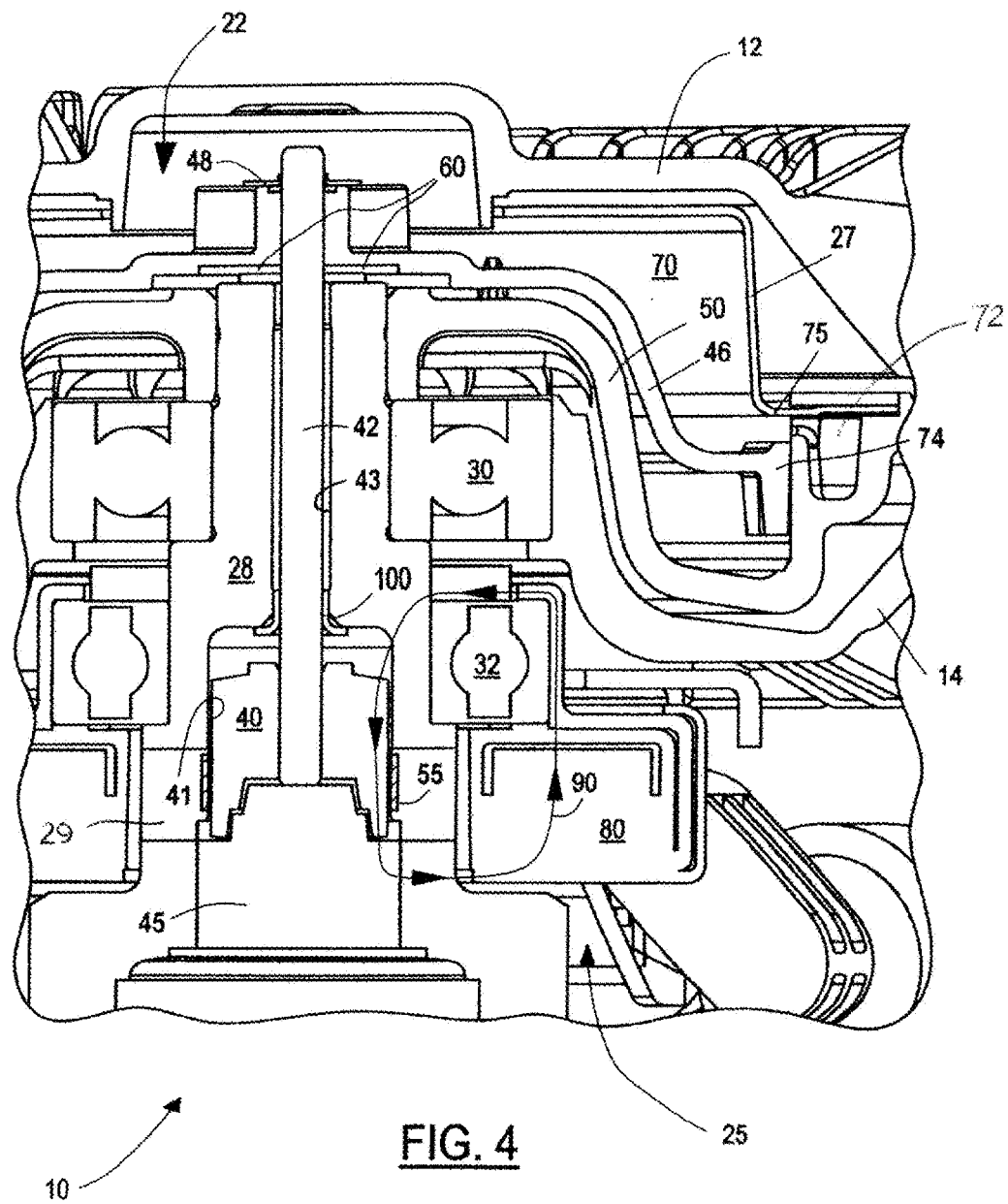
FIG. 4 is an enlarged view of a viscous fan drive in accordance with the present invention when the actuator system is electrically energized, thus opening the passageway between the fluid reservoir chamber and fluid operating chamber.

A bushing member 55 can be provided in the cavity 41 to assist movement of the piston member 40 (see FIG. 4). The bushing member 55 can be made of, for example, a Teflon coated steel or bronze material.

A reservoir cover 27 is positioned in the cavity 22. The reservoir cover 27 and the rotor member 50 cooperate to form a fluid reservoir chamber 70. Movement of the actuator shaft member 42 in the vertical direction as shown in FIGS. 3 and 4 operates to move the valve disk member 46 in that same direction and thus open and close a valve mechanism 74 between the fluid reservoir chamber 70 and the fluid working chamber 72 and allow communication between them and to allow fluid to flow between them. The valve mechanism 74 preferably includes a pair of diametrically opposite holes or openings 75.

The relative positioning of the valve disk member 46 is controlled by the return spring member 60 and the electronic mechanism 25 of the viscous clutch. The spring member 60 is biased or unbiased by the actuator piston 40 which is magnetically driven by the electronic system 25. This in turn controls the amount of viscous fluid contained in the operating chamber and reservoir chamber.

The basic operation of a viscous clutch is well known and does not have to be described herein in detail. In general, the actuation assembly is connected to the cooling fan which is activated when cooling is necessary for the system. A wiper element is present at the outer periphery of the working chamber which generates a localized region of relatively higher fluid pressure and continuously pumps a small quantity of fluid from the working chamber back into the reservoir chamber through a radial passage (not shown), but in a manner well known in the art. The radially outer portions of the rotor member 50 in the working chamber area have a plurality of annular lands 51 which mate with adjacent surfaces 52 of the body or cover member, or both. The annular lands are interdigitated to define a serpentine-shaped viscous shear space therebetween. Again, this arrangement is well known in the viscous clutch art, and it is believed that those skilled in the art will fully understand the construction and operation of the fluid coupling device as shown.

The actuator 25 is electrically coupled to and controlled by an external controller 76. A plurality of sensors 78, including, for example, an engine temperature sensor and/or a pressure sensor to the air conditioner are electrically connected to the controller 76 and provide electrical signals regarding a particular engine operating parameter. The controller 76 interprets the electrical signals from the sensors and sends an electrical signal to the actuator 25 to control the relative positioning of the valve disk 46 to control the relative engagement or disengagement of the fan member.

To engage the fan drive, as shown in FIG. 4, the electric coil 80 is activated by the electronic actuation system 25 creating a magnetic flux which travels around the bearing set 32 and through the actuating piston member 40. This flux circuit 90 is shown in FIG. 4. The actuator piston member 40 which is metallic reacts in response to the magnetic flux to axially move in a direction against the bias of the spring member 60 (i.e. in an axial downward direction in FIGS. 3 and 4). Since the actuator shaft member 42 and valve disk member 46 are coupled to the actuator piston member 40, they are moved together (in a vertically downward direction in FIG. 4) thereby causing the valve disk member 46 to open the low pressure fill holes 75 and allow movement of viscous fluid from the reservoir chamber 70 to the working chamber 72. This activates rotational movement of the rotor member 50 and the cooling fan member.

When the power to the electronic actuator system 25 is "off", the return spring 60 biases back toward its natural position, thereby pulling the valve disk member 46 upward (vertically upward in FIG. 3). This covers the low pressure fill holes 75 and prevents viscous fluid from entering the working chamber 72 from the reservoir chamber 70. Due to the wiper system, fluid in the operating chamber (and working chamber) will then be returned to the reservoir chamber and the rotor and fan member will cease rotating.

In between the "on" and "off" positions, the viscous clutch is capable of operating in a partially engaged position and thus allow rotation of the fan member at any desired speed. By decreasing the amount of power to the electronic actuator system 25 (or only increasing it partially), the magnetic flux available to move the actuator piston member 40 is changed. This positions the rotor in a partially open/closed position and meters the amount of viscous fluid which is allowed into, and which is retained in, the operating chamber. In reality, the rotor member pulsates or vibrates alternating opening and closing the fill holes 75 the requisite amount of time in order to allow the requisite amount of viscous fluid to exist in the working chamber and thus precisely control the speed of the fan member. This slippage between the input members and the output members which drives the fan members as a function of the input speed (which is a function of the amount of viscous fluid contained in the working chamber) is understood by those of ordinary skill in the art. This is the so-called partially engaged or mid-speed position.

When the power is turned off completely to the electronic actuator mechanism 25, thereby removing the magnetic flux that drives the actuator piston 40 against the force of the return spring 60, the return spring 60 is designed to force the valve disk member 46, actuator shaft member 42 and actuator piston member 40 back to their rest positions (vertically upwards in FIG. 3).

The amount of electrical power supplied in terms of pulse width modulation (PWM) from the external controller 76 and power source, enhance the amount of magnetic flux created to drive the actuator piston 40, is determined by an external controller. As indicated above, the controller 76 receives a set of electrical inputs from various engine sensors 78 that monitor various engine operating conditions relating to engine temperature. Thus, for example, if the external controller 76 determines that the engine coolant temperature is too high, a signal is sent from the controller to the actuator 25 to actuate the electric coil 80. This leaves the fill holes open in order to provide all viscous fluid flow to the operating and working chamber.

On the other hand, when the controller 76 determines that one or more of these sensors is sensing that the engine is operating within the desired range, the external controller and power source will not send any electrical power to the coil 80 and thus prevent the fan from operating. Under this condition, no viscous fluid will enter the operating chamber or working chamber, and the amount of slippage in the lands between the rotor member and the cover member and/or body member to drive the rotor member will decrease to disengage speed. Also, when the engine is turned off and hence no magnetic flux is achieved to move the actuator piston 40, the return spring 60 will hold the valve disk 46 against the fill holes. This allows the viscous fluid to drain from the operating chamber into the reservoir chamber. This will minimize or prevent the condition known as "morning sickness".

As persons of ordinary skill in the art appreciate, the actual amount of pulse width modulation PWM necessary to energize the coil 80 is dependent upon many factors, including the strength of the return spring 60. Further, the size of the fill holes 75 may affect the amount of biasing necessary.

In a typical viscous fluid clutch device of this type, the actuator shaft member 42 is made of a stainless steel material, the central shaft member 28 is made of a carbon steel material, and the actuator piston member 40 is made of a carbon steel member. The shaft member 28 also can have a stainless steel portion 29. A washer or bushing member 100 is also positioned on the actuator shaft member 42 where it enters the central bore or cavity 43. With the present invention, the bushing member is made from a non-magnetic (or insulating) material in order to prevent the magnetic flux path 90 from passing through it and include the bushing member 100. If the flux path were to include the bushing member, then it is possible for the actuator shaft member 42 and actuator piston member 40 to "stick", i.e. be magnetically locked in the vertically upwards position (in FIG. 3), thereby disengaging the fan member and possibly overheating the engine.

A collared bushing member 100 is shown in FIGS. 3 and 4 and is a preferred embodiment of the insulating non-magnetic washer in accordance with the present invention. Other acceptable bushing members include flat stainless steel washers and the like.

As indicated, to prevent "sticking" of the actuator shaft member and actuator piston member, the bushing member should be made from a non-magnetic material, such as, for example, the DP4 lead free dry bushings supplied by GGB North America in Thorofare, N.J. These bushings are made from a steel material alloyed with brass and covered with a Teflon material. It is also possible, of course, to utilize other insulating or non-magnetic materials for the bushing member, so long as the objects and purposes of the present invention are met. For example, the material for the bushing member could be bronze, Teflon, stainless steel, aluminum, a composite material, or a plastic polymer material. The insulating bushing member 100 prevents the flux line from the electric coil from magnetizing the bushing which might retain the piston 40 in an incorrect position when the electric current is applied. The flux pattern would seek the least path of resistance which would be the armature to the input shaft 28 and magnetically stick them together. The insulated bushing or washer 100 thus creates a "magnetic break" which prevents such a situation from occurring.

As another embodiment of the invention, a "failsafe" embodiment could be provided. In this embodiment, a biasing member would be situated to provide a biasing force opening communication between the reservoir and operating chambers. In this alternate embodiment, an electronic actuator mechanism then would be actuated by a controller when cooling was no longer needed for the system. The actuator would create a magnetic flux path driving the actuator piston against the force of the spring and thereby cause the fan to cease rotating. This embodiment creates a "failsafe" mode because if the electric system of the vehicle were to fail or otherwise cease operating, the cooling fan would continue to operate. This would prevent the vehicle cooling system from overheating and allow the driver to drive the vehicle to a safe location to be fixed.

While the invention described in connection with various embodiments, it will be understood that the invention is not limited to those embodiments. On the contrary, the invention covers all alternatives, modifications, and equivalents as may be included within the spirit and scope of the appended claims.

What is claimed is:

1. An electronically controlled fluid coupling device comprising:
   an output member including a center shaft member;
   an input member positioned around said output member, said input member comprising a body member and a cover member;
   bearing members positioned between said input member and said output member;
   a rotor member mounted to said output member and contained within said cover and said body member;
   a reservoir cover member mounted to said input member, said reservoir cover member having at least one fill port;
   a fluid reservoir chamber defined between said reservoir cover member and said rotor member, said fluid reservoir chamber having a quantity of viscous fluid;
   a fluid operating chamber defined between said rotor member and said body member, said fluid operating chamber fluidically coupled to said fluid reservoir chamber through said at least one fill port;
   said center shaft member having a first and a second cavity;
   a piston member positioned in said first cavity and being moveable axially in response to a magnetic field;
   an actuator shaft member fixedly attached to said piston member and axially moveable therewith, said actuator shaft member positioned in said second cavity;
   a collared bushing member positioned around said actuator shaft member substantially at the intersection of said first cavity with said second cavity for guiding said actuator shaft member in said second cavity;
   said collared bushing member being made from a non-magnetic material and not positioned in a magnetic flux path;
   a valve disk member coupled to said actuator shaft member, said valve disk member capable of covering said at least one fill port when said valve member is in a first position, therein preventing flow of said quantity of viscous fluid from said fluid reservoir chamber to said fluid operating chamber, said valve disk member capable of partially covering said at least one fill port when said rotatable valve member is in a midlevel position, therein allowing partial flow of said quantity of viscous fluid from said fluid reservoir chamber to said fluid operating chamber to partially engage said rotor and said output member, and said valve disk member capable of completely uncovering said at least one fill port when said valve member is in a second position therein allowing full flow of said quantity of viscous fluid to said fluid operating chamber;
   an electromagnetic subassembly mounted to said input member;
   a controller electrically coupled to said electromagnetic subassembly, and adapted to provide an electrical current to said electromagnetic subassembly, said electromagnetic subassembly being able to selectively induce said magnetic field, wherein said valve member subassembly moves axially between said first position, said midlevel position, and said second position depending upon the strength of said magnetic field.

2. The fluid coupling device of claim 1 further comprising a biasing spring member, said spring member maintaining said valve disk member subassembly in said first position in the absence of said magnetic field.

3. The fluid coupling device of claim 1, wherein said input member further comprises a belt driven pulley member.

4. The fluid coupling device of claim 1, wherein said input member further comprises a water pump shaft.

5. The fluid coupling device of claim 1 further comprising at least one sensor electrically coupled to said controller, said at least one sensor sending an electrical signal to said controller as a function of a desired engine operating condition.

6. The fluid coupling device of claim 1 further comprising a biasing spring member, said spring member maintaining said valve disk member subassembly in said second position in the absence of said magnetic field.

7. An electronically controlled fluid coupling device comprising:
   an output member including a center shaft member;
   an input member positioned around said output member, said input member comprising a body member and a cover member;
   bearing members positioned between said input member and said output member;
   a rotor member mounted to said output member and contained within said cover and said body member;
   a reservoir cover member mounted to said input member, said reservoir cover member having at least one fill port;
   a fluid reservoir chamber defined between said reservoir cover member and said rotor member, said fluid reservoir chamber having a quantity of viscous fluid;
   a fluid operating chamber defined between said rotor member and said body member, said fluid operating chamber fluidically coupled to said fluid reservoir chamber through said at least one fill port;
   said center shaft member having a fist cavity and second cavity;
   a piston member positioned in said first cavity and being moveable axially in response to a magnetic field;
   an actuator shaft member fixedly attached to said piston member and axially moveable therewith, said actuator shaft member positioned in said second cavity;
   a collared bushing member positioned around said actuator shaft member substantially at the intersection of said first cavity with said second cavity for guiding said actuator shaft member in said second cavity;
   said collared bushing member being made from a non-magnetic material and not positioned in a magnetic flux path;
   a valve disk member coupled to said actuator shaft member, said valve disk member capable of covering said at least one fill port when said valve member is in a first position, and said valve disk member capable of uncovering said at least one fill port when said valve member is in a second position;
   an electromagnetic subassembly mounted to said input member;
   a controller electrically coupled to said electromagnetic subassembly, and adapted to provide an electrical current to said electromagnetic subassembly, said electromagnetic subassembly being able to selectively induce said magnetic field, wherein said valve member subassembly moves axially between said first position, and said second position depending upon the strength of said magnetic field; and
   a biasing spring member, said spring member maintaining said valve disk member subassembly in said first position in the absence of said magnetic field.

8. The fluid coupling device of claim 7 further comprising at least one sensor electrically coupled to said controller, said at least one sensor sending an electrical signal to said controller as a function of a desired engine operating condition.

9. The fluid coupling device of claim 7 wherein said valve member is capable of being positioned in a plurality of midlevel positions between said first and second positions.

10. An electronically controlled fluid coupling device comprising:
- an output member including a center shaft member;
- an input member positioned around said output member, said input member comprising a body member and a cover member;
- bearing members positioned between said input member and said output member;
- a rotor member mounted to said output member and contained within said cover and said body member;
- a reservoir cover member mounted to said input member, said reservoir cover member having at least one fill port;
- a fluid reservoir chamber defined between said reservoir cover member and said rotor member, said fluid reservoir chamber having a quantity of viscous fluid;
- a fluid operating chamber defined between said rotor member and said body member, said fluid operating chamber fluidically coupled to said fluid reservoir chamber through said at least one fill port;
- said center shaft member having a first cavity and a second cavity;
- a piston member positioned in said first cavity and being moveable axially in response to a magnetic field;
- an actuator shaft member fixedly attached to said piston member and axially moveable therewith, said actuator shaft member positioned in said second cavity;
- a collared bushing member positioned around said actuator shaft member substantially at the intersection of said first cavity with said second cavity for guiding said actuator shaft member in said second cavity;
- said collared bushing member being made from a non-magnetic material and not positioned in a magnetic flux path;
- a valve disk member coupled to said actuator shaft member, said valve disk member capable of covering said at least one fill port when said valve member is in a first position, and said valve disk member capable of uncovering said at least one fill port when said valve member is in a second position;
- an electromagnetic subassembly mounted to said input member;
- a controller electrically coupled to said electromagnetic subassembly, and adapted to provide an electrical current to said electromagnetic subassembly, said electromagnetic subassembly being able to selectively induce said magnetic field, wherein said valve member subassembly moves axially between said first position, and said second position depending upon the strength of said magnetic field; and
- a biasing spring member, said spring member maintaining said valve disk member subassembly in said second position in the absence of said magnetic field.

11. The fluid coupling device of claim 10 further comprising at least one sensor electrically coupled to said controller, said at least one sensor sending an electrical signal to said controller as a function of a desired engine operating condition.

12. The fluid coupling device of claim 10 wherein said valve member is capable of being positioned in a plurality of midlevel positions between said first and second positions.

* * * * *